United States Patent
Edwards et al.

(10) Patent No.: US 10,783,246 B2
(45) Date of Patent: *Sep. 22, 2020

(54) COMPARING STRUCTURAL INFORMATION OF A SNAPSHOT OF SYSTEM MEMORY

(71) Applicant: HEWLETT PACKARD ENTERPRISE DEVELOPMENT LP, Houston, TX (US)

(72) Inventors: Nigel Edwards, Bristol (GB); Michael John Wray, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 344 days.

This patent is subject to a terminal disclaimer.

(21) Appl. No.: 15/420,404

(22) Filed: Jan. 31, 2017

(65) Prior Publication Data

US 2018/0218153 A1   Aug. 2, 2018

(51) Int. Cl.
G06F 21/56       (2013.01)

(52) U.S. Cl.
CPC ................... *G06F 21/566* (2013.01)

(58) Field of Classification Search
CPC .......... G06F 21/50; G06F 21/52; G06F 21/55; G06F 21/554; G06F 21/56; G06F 21/562; G06F 21/565; G06F 21/566
See application file for complete search history.

(56) References Cited

U.S. PATENT DOCUMENTS

| | | | |
|---|---|---|---|
| 8,352,484 B1 | 1/2013 | Schneider | |
| 8,448,243 B1 | 5/2013 | Sankruthi et al. | |
| 8,479,296 B2 | 7/2013 | Mashevsky et al. | |
| 8,584,235 B2 | 11/2013 | Topan et al. | |
| 8,925,089 B2 | 12/2014 | Sallam | |
| 8,935,789 B2 | 1/2015 | Shukla | |
| 8,984,331 B2 | 3/2015 | Quinn | |
| 9,294,486 B1 | 3/2016 | Chiang et al. | |
| 9,355,247 B1 | 5/2016 | Thioux et al. | |
| 9,392,016 B2 | 7/2016 | Sallam | |
| 9,483,644 B1 | 11/2016 | Paithane et al. | |
| 9,594,912 B1 | 3/2017 | Thioux et al. | |
| 9,652,616 B1 | 5/2017 | Bhatkar et al. | |
| 9,690,938 B1 | 6/2017 | Saxe et al. | |
| 9,910,986 B1 | 3/2018 | Saxe et al. | |
| 9,922,192 B1 | 3/2018 | Kashyap et al. | |
| 9,928,366 B2 | 3/2018 | Ladnai et al. | |
| 9,998,484 B1 | 6/2018 | Buyukkayhan et al. | |
| 2007/0240217 A1 | 10/2007 | Tuvell et al. | |

(Continued)

OTHER PUBLICATIONS

A. White, Identifying the Unknown in User Space Memory, 2013, Queensland University of Technology, pp. 1-175 (Year: 2013).*

(Continued)

*Primary Examiner* — Jung W Kim
*Assistant Examiner* — Adrian Stoica
(74) *Attorney, Agent, or Firm* — Hewlett Packard Enterprise Patent Department (57) ABSTRACT

Examples relate to snapshots of system memory. In an example implementation, structural information of a process in a snapshot of system memory is compared with hashes or fuzzy hashes of executable regions of the same process in a previous snapshot of system memory to determine whether there is a structural anomaly.

20 Claims, 9 Drawing Sheets

(56) References Cited

U.S. PATENT DOCUMENTS

| | | |
|---|---|---|
| 2007/0240218 A1 | 10/2007 | Tuvell et al. |
| 2010/0031361 A1 | 2/2010 | Shukla |
| 2011/0041179 A1 | 2/2011 | Staahlberg |
| 2011/0265182 A1* | 10/2011 | Peinado .............. G06F 21/554 726/24 |
| 2012/0144490 A1 | 6/2012 | Hartrell et al. |
| 2012/0255013 A1 | 10/2012 | Sallam |
| 2013/0111591 A1 | 5/2013 | Topan et al. |
| 2014/0068326 A1 | 3/2014 | Quinn |
| 2014/0325656 A1 | 10/2014 | Sallam |
| 2015/0256552 A1 | 9/2015 | Lee et al. |
| 2016/0078225 A1 | 3/2016 | Ray et al. |
| 2016/0080399 A1 | 3/2016 | Harris et al. |
| 2016/0080417 A1 | 3/2016 | Thomas et al. |
| 2016/0080418 A1 | 3/2016 | Ray et al. |
| 2016/0094564 A1 | 3/2016 | Mohandas et al. |
| 2016/0164901 A1 | 6/2016 | Mainieri et al. |
| 2016/0180090 A1 | 6/2016 | Dalcher et al. |
| 2016/0212159 A1 | 7/2016 | Gupta et al. |
| 2016/0381051 A1 | 12/2016 | Edwards et al. |
| 2017/0006049 A1* | 1/2017 | Muttik .............. H04L 63/1416 |
| 2017/0032120 A1 | 2/2017 | Tolpin et al. |
| 2017/0061126 A1 | 3/2017 | Hooks |
| 2017/0083702 A1 | 3/2017 | Gathala et al. |
| 2017/0147819 A1 | 5/2017 | Vasilenko et al. |
| 2017/0149804 A1 | 5/2017 | Kolbitsch et al. |
| 2017/0171229 A1 | 6/2017 | Arzi et al. |
| 2017/0171230 A1 | 6/2017 | Leiderfarb et al. |
| 2017/0193230 A1 | 7/2017 | Jevnisek et al. |
| 2017/0195353 A1 | 7/2017 | Taylor et al. |
| 2017/0206357 A1 | 7/2017 | Gorelik et al. |
| 2017/0243000 A1 | 8/2017 | Shraim et al. |
| 2017/0300690 A1 | 10/2017 | Ladnai et al. |
| 2017/0372068 A1 | 12/2017 | Zimmerman |
| 2018/0039776 A1 | 2/2018 | Loman et al. |

OTHER PUBLICATIONS

Antonio Bianchi et al., "Blacksheep: Detecting Compromised Hosts in Homogeneous Crowds," CCS'12, Oct. 16-18, 2012, Raleigh, North Carolina, USA, pp. 1-12, ACM.

Manoun Alazab et al., "Malware Detection Based on Structural and Behavioural Features of API Calls," Proceedings of the 1st International Cyber Resilience Conference, Aug. 23, 2010, Edith Cowan University, Perth Western Australia, pp. 1-11, Edith Cowan University.

Matthew G. Schultz et al., "Data Mining Methods for Detection of New Malicious Executables," Proceedings 2001 IEEE Symposium on Security and Privacy, May 14-16, 2001, Oakland, CA, USA, pp. 1-12, IEEE.

S. Momina Tabish et al., "Malware Detection using Statistical Analysis of Byte-Level File Content," CSI-KDD'09, Jun. 28, 2009, Paris, France, pp. 1-9, ACM.

Usukhbayar Baldangombo et al., "A Static Malware Detection System Using Data Mining Methods," Aug. 13, 2013, pp. 1-13, Cornell University Library.

Yiheng Duan et al., "Detective: Automatically Identify and Analyze Malware Processes in Forensic Scenarios via DLLs," IEEE ICC 2015—Next Generation Networking Symposium, 2015, pp. 5691-5696, IEEE.

Youngjoon Ki et al., "A Novel Approach to Detect Malware Based on API Call Sequence Analysis," Research Article, International Journal of Distributed Sensor Networks, Apr. 4, 2015, pp. 1-9, vol. 2015, Article ID 659101; Hindawi Publishing Corporation.

Nappa et al., "Driving in the Cloud: An Analysis of Drive-by Download Operations and Abuse", DIMVA'13 Proceedings of the 10th international conference on Detection of Intrusions and Malware, and Vulnerability Assessment, 2013, 20 pages.

"Cuckoo Sandbox", available online at <https://web.archive.org/web/20160625053131/https://github.com/cuckoosandbox/cuckoo>, Jun. 22, 2016, 2 pages.

* cited by examiner

```
Obtain structural information of executable
regions of a process extracted from a
snapshot of system memory, wherein the          — 110
structural information includes a hash or fuzzy
hash of each executable region of the process
```

```
Compare the structural information of the
process with a process model which includes
hashes or fuzzy hashes of executable regions    — 120
of the same process in a previous snapshot of
system memory
```

```
Determine there is a structural anomaly in the
process in response to a determination that     — 130
the structural information of the process
includes a hash or fuzzy hash which is
inconsistent with the process model
```

```
Generate a malware alert in response to the
determination that there is a structural        — 140
anomaly
```

```
410  Obtain a first snapshot of system memory
     including a first process 420  After obtaining the first snapshot, launching a
     second process 430  After launching the second process, obtaining
     a second snapshot of system memory 440  Make a comparison of structural information of
     the first snapshot with structural information of
     the second snapshot, wherein the comparison
     includes comparing hashes or fuzzy hashes of
     executable regions of the first process in the
     first snapshot with hashes or fuzzy hashes of
     executable regions of the first process in the
     second snapshot 450  Determine, based on the comparison, whether
     there is a structural anomaly which indicates
     that a structure of the first process has
     changed between the first snapshot and the
     second snapshot
```

COMPARING STRUCTURAL INFORMATION OF A SNAPSHOT OF SYSTEM MEMORY

BACKGROUND

Malware refers to hostile or intrusive software, including computer viruses, worms, trojan horses, ransomware, spyware, adware, scareware, and other malicious programs. Malware may be used for data exfiltration, financial fraud, intellectual property theft and other nefarious purposes. One approach for detecting malware is to scan files for sequences of bytes, known as signatures, which are associated with known malware. However, malware authors are aware of this approach and therefore frequently repackage their malware to change its signatures and thus avoid detection.

BRIEF DESCRIPTION OF THE DRAWINGS

Examples of the present disclosure will now be described, by way of non-limiting example, with reference to the accompanying drawings, in which.

DETAILED DESCRIPTION

A process is an instance of a computer program which is being executed in system memory. For example, a process may be an instance of application software. A process may inhabit a user address space in system memory. The process may include executable regions hosting executables and data regions hosting data. An executable is a module of executable code which may include instructions which are executable by a processor, such as a central processing unit (CPU) of a computer. A library is a special type of executable, which is explained in more detail later. References in this disclose to executables should be interpreted broadly to include libraries, as well as other types of executable, unless the context demands otherwise.

In order to hide itself, malware may use various techniques including process hollowing, dynamic link library (DLL) injection and application programming interface (API) hooking. In process hollowing the malware starts a normal process such as Explorer.exe in suspended mode, copies itself into the memory of the suspended process overwriting the existing in-memory executable and then resumes the process which is now infected with malware. As the name of the process remains the same, the user just sees the normal process (e.g. Explorer.exe) running.

In DLL injection, the malware allocates a new region of memory in each process it wishes to inject, copies itself into that region and starts a thread inside the new memory region. Thus while the injected process may include the original content it also hosts a malware thread. The user is unlikely to see any symptom while using conventional system tools. API hooking involves replacing the first few bytes of library routines such as HttpSendRequest and InternetReadFile to redirect the call into the injected DLL where credentials and other information are stolen, before jumping back into the original library routine so it executes normally.

The above techniques involve making changes to executable regions of system memory. Even while attempting to hide within a process, malware needs to make certain changes to the process in order for the malware to operate. These changes may alter the structure of the process. One example of the present disclosure proposes obtaining structural information of a process from a snapshot of system memory and comparing the structural information of the process with structural information of a process model of the same process based on a previous snapshot of system memory. If there is a difference, this may indicate that the structure of the process has been changed by malware. The structural information may for example include a hashes or fuzzy hashes of an executable region associated with the process. An executable region of system memory may comprise code relating to an executable, library or shared library etc.

In the context of this disclosure a "hash or fuzzy hash" of an executable region means either one or both of a hash and fuzzy hash of the executable region. I.e. the structural information is considered to include "a hash or fuzzy hash of an executable region" if it meets any one of the following criteria: the structural information includes a hash of the executable region, the structural information includes the fuzzy hash of an executable region, or the structural information includes both a hash and a fuzzy hash of the executable region. The hash of the executable region may be computed by hashing the file on disk that was loaded into the executable region. The fuzzy hash of the executable region may be computed by applying a fuzzy hash function to the content of the executable region in the snapshot of system memory.

One aspect of the present disclosure comprises obtaining structural information of a first process from a snapshot of system memory, launching a second process and then obtaining a second snapshot of system memory. A comparison of structural information of the first snapshot and structural information of the second snapshot may be made. Then, based on the comparison, a determination may be made as to whether there is a structural anomaly which indicates that a structure of the first process has changed between the first snapshot and the second snapshot. Usually one would not expect a second process to change the structure of an independent first process. Therefore, if the structure has changed, this structural anomaly may indicate that the second process is malware which has infected the first process. The structural anomaly may be taken as a characteristic of the malware and be used to generate an indicator of compromise for use in a malware detection system.

Figure 1A:
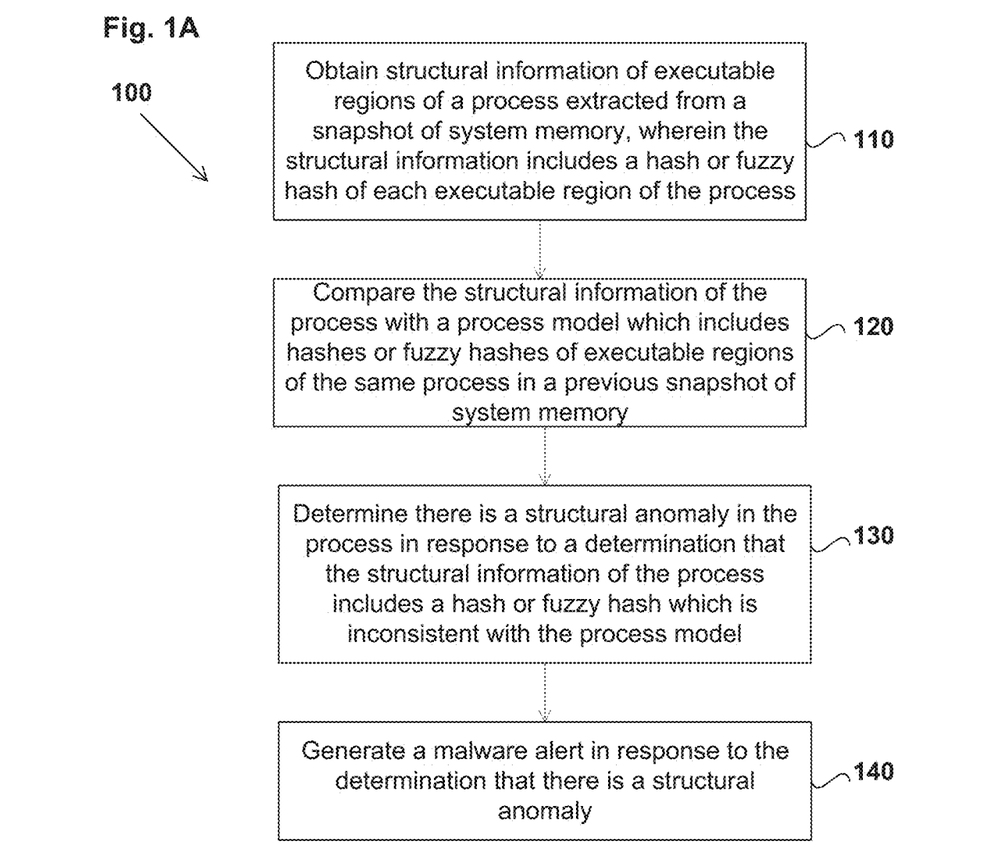
FIG. 1A shows an example of a method of comparing structural information of a process with a process model, according to the present disclosure.

FIG. 1A shows a computer implemented method 100 to detect or analyse malware according to one example.

At block 110 structural information of executable regions of a process extracted from a snapshot of system memory is obtained. The process may be a process that was running in system memory of a computer system which is under examination. In this context, extracted means that some or all contents of the process, or information relating to the process, were obtained from a snapshot of system memory.

In this respect the method of the present disclosure differs from static malware detection methods which scan a file on a hard disk or solid state drive, because the method according to the present disclosure examines information derived from a process loaded into system memory. The method of the present disclosure also differs from dynamic malware detection methods which detect operations carried out by an executing process over an extended period of time, as the method of the present disclosure is based on information derived from a snapshot of system memory at a particular point in time.

The structural information includes a hash or fuzzy hash of each executable region of the process. The executable regions may, for example, correspond to executables, libraries, shared libraries or anonymous unnamed executable regions associated with the process. In the context of this disclose a "hash or fuzzy hash" of an executable region means either one or both of a hash and fuzzy hash of the executable region.

At block 120 structural information of the process is compared with a process model which includes hashes or fuzzy hashes of executable regions of the same process in a previous snapshot of system memory.

At block 130 the method determines whether there is a structural anomaly in the process. A structural anomaly is a difference between the structural information of the process and the structural information of the process model. If the structural information of the process includes a hash or fuzzy hash which is inconsistent with the process model, then it is determined that there is a structural anomaly in the process. Examples of a hash or fuzzy hash which is inconsistent with the process model may include, for example, a hash or fuzzy hash of an executable region which exists in the process, but for which no corresponding hash or fuzzy hash is found in the process model, or an executable region which has the same name, but a different hash or fuzzy hash in the process compared to the executable region in the process model.

At block 140 a malware alert is generated in response to a determination that there is a structural anomaly. The malware alert may be, but is not limited to, any of the following: a message to a system administrator, a message to a user of the computer system, creating an entry in a log, triggering further operations to verify that malware is present, analyze or cleanse the malware etc. Similar references to an alert or malware alert made elsewhere in this disclosure are to be interpreted in the same manner.

In one example, the malware alert automatically triggers analysis of code of the executable region which corresponds to the structural anomaly. In another example, the malware alert causes generation of an indicator of compromise for use in a malware detection system. The indicator of compromise may include information relating to the structural anomaly and be used by malware detection systems to detect malware. E.g. a malware detection system may analyze structural information of a process to determine whether any of a number of known indicators of compromise are present. In such cases the method of FIG. 1A operates as an automated tool or method to investigate and characterize malware and generate indicators of compromise.

In one example, the method 100 of FIG. 1A runs on the computer system which is being examined. In this case, obtaining the structural information may include scanning the system memory of the computer system to obtain a snapshot, extracting a process from the snapshot and determining structural information of the extracted process. In another example, the method of FIG. 1A may be run on a separate computer system than the one under examination, in which case obtaining the structural information may include receiving the structural information from the computer system being examined, or receiving a full or partial snapshot of system memory from the computer system being examined and determining the structural information from the received snapshot.

Figure 1B:
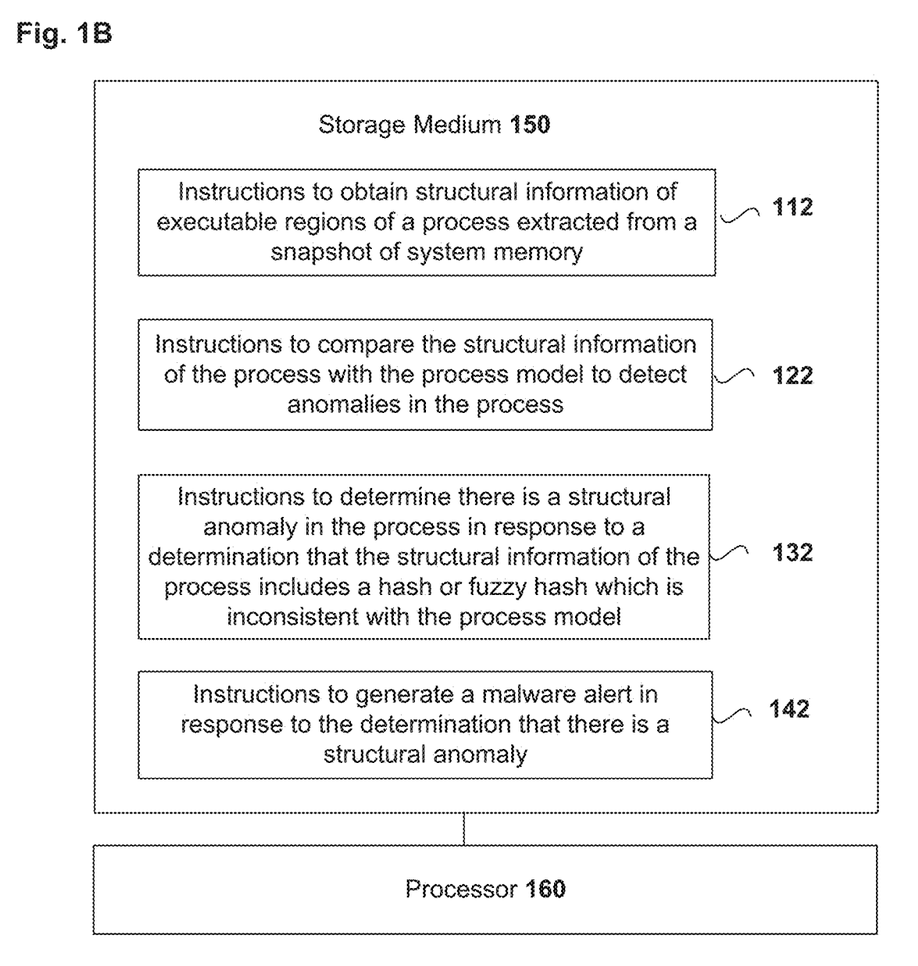
FIG. 1B shows an example of a non-transitory storage medium storing instructions to compare structural information of a process with a process model, according to the present disclosure.

FIG. 1B shows a set of instructions, stored on a non-transitory storage medium 150, which may be executed by a processor 160 to perform the method of FIG. 1A. The processor may for example be a central processing unit (CPU), microprocessor or other electronic processing device. The storage medium may for example be a hard disk, flash drive or memory etc. of a computer system.

The instructions 112, 122, 132 and 142 in FIG. 1B correspond to method blocks 110, 120, 130 and 140 of FIG. 1A respectively and cause the method blocks to be implemented when executed by processor 160.

A snapshot of system memory may include many processes, for example several hundred different processes. It may be desired to examine each of the processes in the current snapshot to detect or analyse malware. Furthermore, the previous snapshot may include a large number of processes, so there may be a plurality of process models, one for each respective process. Thus, there may be a large number of processes in the current snapshot and a large number of process models based on a previous snapshot. Therefore a method is provided for matching a process in the current snapshot with the corresponding process model. In this way, the executable regions of the process need only be compared with executable regions of the corresponding process model, not with all the executable regions of all processes in the previous snapshot.

In one example the process in the snapshot of system memory is matched with one process model of a plurality of process models, in response to an identifier of the process matching an identifier the process model. For example, the identifier may be a name of the process. E.g. if the extracted process is Explorer.exe then it may be matched with an Explorer.exe process model. The Explorer.exe process model will include structural information based on the structure of Explorer.exe in a previous snapshot of system memory. In other examples, the matching of the process with the process model may be by another identifier, such as by hash or fuzzy hash of a main executable of the process. Once a process has been matched with a corresponding process model, the structural information such as hashes or fuzzy hashes of the executable regions of the process may be compared with the structural information of the corresponding process model.

Figure 2A:
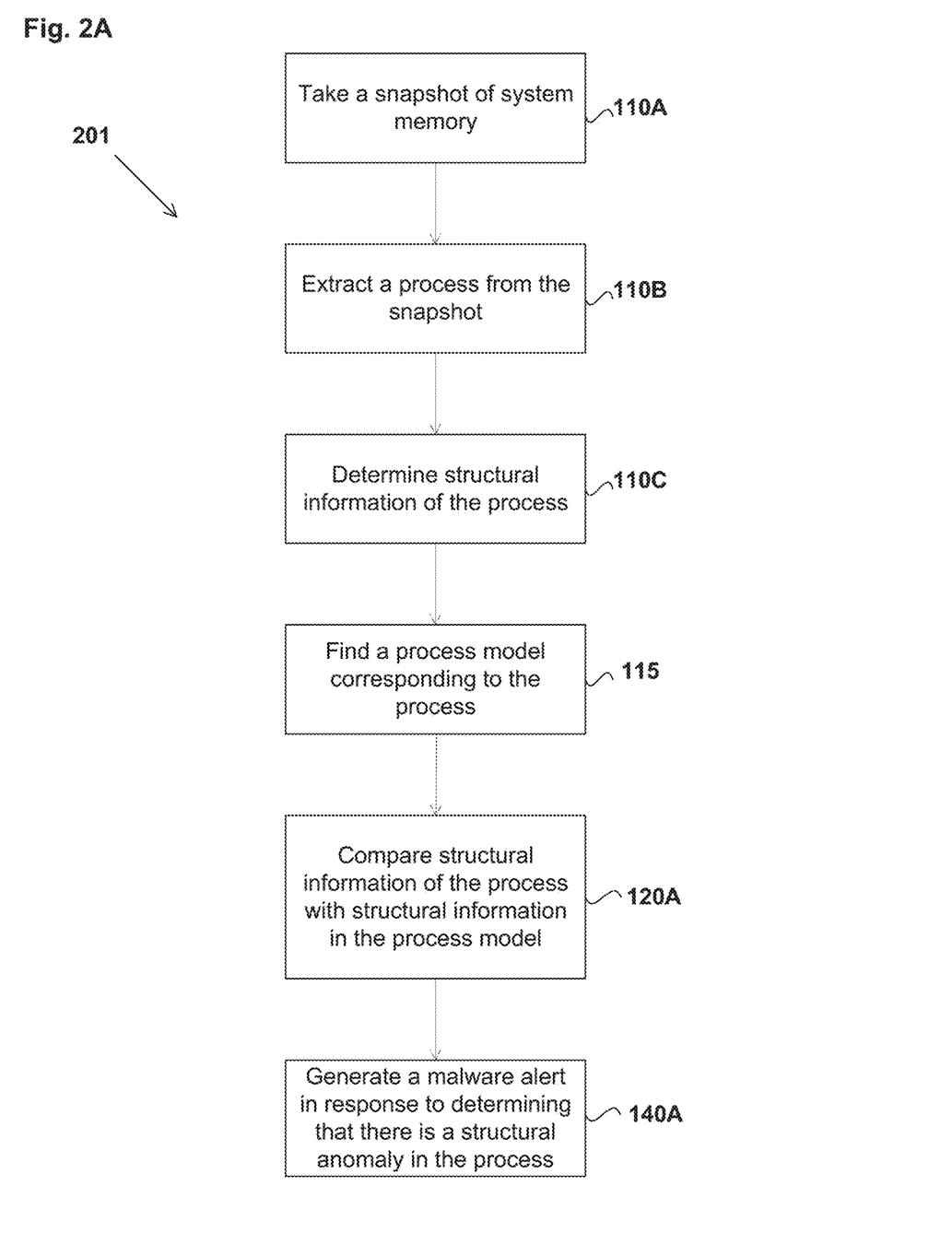
FIG. 2A shows an example of a method of comparing structural information of a process with a process model, according to the present disclosure
Figure 2B:
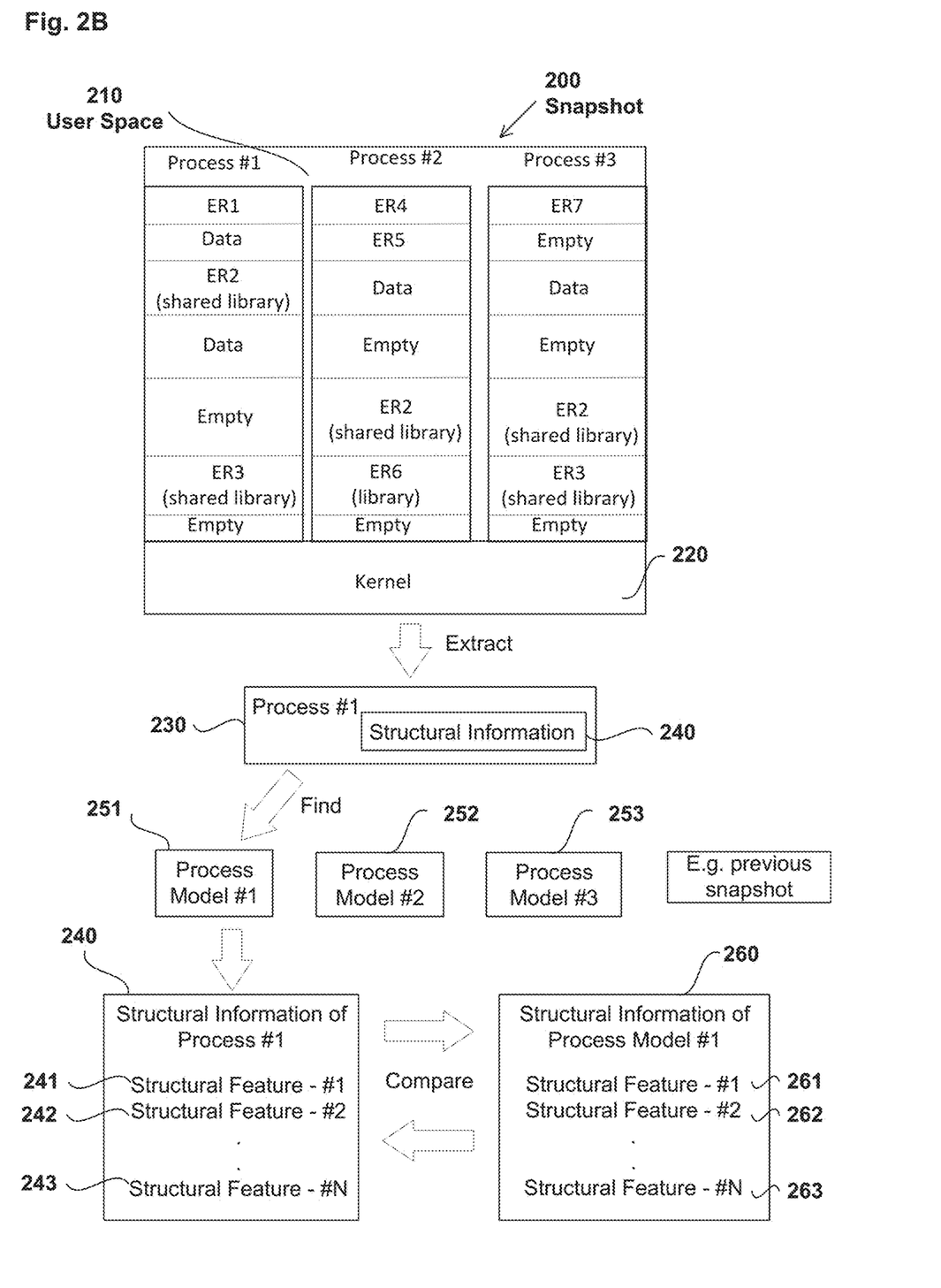
FIG. 2B shows an example of a method of comparing structural information of a process with a process model and an example snapshot of system memory according to the present disclosure.

FIG. 2A shows a further example method, with reference to an example of a snapshot of system memory shown in FIG. 2B. FIG. 2B shows an example snapshot of system memory, as well as a schematic illustration of the method of FIG. 2A.

With reference to FIG. 2B, a snapshot of system memory 200 may include user space 210 and a kernel 220. The user space 210 is user address space in the system memory and may include a plurality of processes. A process is an instance of a computer program which is being executed in system memory. For example, a process may be an instance of application software. A process typically includes a main executable and may include a number of other executables. The main executable is an executable that controls the flow of the process and which may call libraries or other executables to perform certain functions.

The kernel 220 is the core of the operating system and may handle interactions between the processes in user space and the CPU, memory and/or peripheral devices. The kernel 220 may manage allocation of user space to the processes. The kernel is resident in a dedicated kernel space which is a region of system memory which is reserved for the kernel. The kernel 220 may include a process list of all the processes running in user space and pointers to the address space which each process occupies. The kernel may also include a module list for each process. A module list of a process includes a list of the executables associated with the process and pointers to the locations of the executables in user space.

The example snapshot of system memory in FIG. 2B includes three processes: Process 1, Process 2 and Process 3. However, it is to be appreciated that there may be fewer or more processes and in many cases the user space may include hundreds of processes. Each process may comprise any number of executable regions, data regions and/or empty regions. Executable regions contain executable code, data regions contain data and empty regions are empty. For instance, Process 1 includes first, second and third executable regions ER1, ER2 and ER3 as well as data regions and empty regions.

Each executable region may include an executable. An executable is a set of encoded instructions that may be executed by the processor. The executable may have been loaded into system memory from a file, for example a file on a disk or other storage medium.

A library is a special type of executable which may interact with other executables in a predefined manner, for example through a set of predefined function calls. In addition to executable code, a library may also include templates, data or other resources. As the function calls and responses to function calls follow a predefined format, a library may be used by a plurality of different executables in a process. References in this disclose to executables should be interpreted broadly to include libraries, as well as other types of executable, unless the context demands otherwise.

A shared library is a library which may be used by a plurality of processes, i.e. it is shared by the processes. A dynamic linked library (DLL) is one example of a type of shared library in the Windows operating system. Shared libraries may be used to perform common functions such as dialog boxes, saving files, making HTTP request etc. Libraries may be used to make system calls to the kernel and thus provide a simple interface through which programmers may access the kernel functions.

Executable regions may contain strings of executable code which are not associated with an executable in the processes module list in the kernel. For example, these strings of executable code may have been dynamically generated, rather than loaded from a file. Such strings of executable code are considered to be executables, but differ from executables loaded from a file on a disk or other storage medium, in that they do not have a file or pathname. Such executable regions, which do not have a file or pathname, may be referred to as anonymous executable regions.

The data in data regions may be data generated by, operated on, manipulated by, or otherwise used by the executables and/or other executable code of the process. The empty regions may be regions that are reserved by the process so that they may be potentially be filled with data or executables etc. later, but at the time of taking the snapshot they were empty.

Referring to the example of FIG. 2B, Process 1 includes first, second and third executable regions ER1, ER2 and ER3. The first executable region ER1 may be a main executable of Process 1. The second and third executable regions ER2 and ER3 in this example are occupied by shared libraries, which may be used by other processes. Process 2 includes a main executable in executable region ER4, another executable in executable region ER5 and a library, which is not a shared library, in executable region ER6. The library in ER6 may be used by the executables in ER4 and ER5 of Process 2, but may not be used by the executables of other processes. Process 3 includes a main executable in ER7 and two shared libraries in executable regions ER2 and ER3.

Shared libraries ER2 and ER3 are shown as belonging to several processes. While the shared libraries could be copied into separate respective regions of memory for each process, in most cases each shared library may occupy just one region in user address space and each process using a shared library may include pointers to the executable region containing the shared library.

The method of FIG. 2A, like the method of FIG. 1A, may be executed by processor or several processors and may be stored as a set of machine readable instructions on a non-transitory storage medium.

At block 110A a snapshot is taken of the system memory 200. For example, this may be accomplished by a computer system saving a copy of the contents of its system memory. The snapshot represents the contents of the system memory at a particular point in time (e.g. 200 of FIG. 2B).

At block 110B a process (e.g. Process 1, 230 of FIG. 2B) is extracted from the snapshot. In the context of this disclosure, extracting the process simply means that information of the process is obtained from the snapshot. In one example, the contents of executable regions (e.g. ER1, ER2, ER3) of the process and/or related metadata from the kernel (e.g. 220) is extracted for further analysis. In one example data regions and/or metadata relating to the data regions are also extracted. In other examples the data regions and/or metadata relating to the data regions, are not extracted so as to save processing time by focusing on the executable regions.

In one example, a location of the process list in the kernel may be found from a process control block of the kernel of the snapshot. A process, such as process 1, may be identified in the process list and the executable regions of the process may be located based on the module list of the process in the kernel. The executable regions or metadata relating to the executable regions of the process may then be extracted.

At block 110C structural information (e.g. 240) of the extracted process is determined. In order to speed up the method, block 110C may analyze the executable regions and/or related metadata, but not the data regions and empty regions, when determining the structural information.

The structural information (e.g. 240) may be determined based on the executable regions (e.g. ER1, ER2, ER3) of the extracted process (e.g. 230) and/or related metadata. For example, the structural information (e.g. 240) includes structural features (e.g. 241, 242, 243) of the process. The structural features may for example include a list of executables, list of libraries and/or other structural features of the process. In one example, each structural feature may be represented by an identifier such as a name, hash, fuzzy hash or other identifier. Determining the structural information may include determining structural features and identifiers of the structural features.

At block 115 a process model (e.g. 251) corresponding to the process is found from among a plurality of process models (e.g. 251, 252, 253). The process models are based on processes in a previous snapshot of system memory. The process (e.g. 240) is matched with a process model (e.g. 251) which relates to the same process. For instance, the process models may be stored in a database or elsewhere and may include a process model 1 (e.g. 251) which is a model based on process 1 in a previous snapshot, a process model 2 (e.g. 252) which is a model based on process 2 in the previous snapshot and a process model 3 (e.g. 253) which is a model based on process 3 in the previous snapshot. In this example the extracted process 1 (e.g. 240) is matched with process model 1 (e.g. 251).

At block 120A structural information of the process is compared with structural information of the process model. Block 120A of the method of FIG. 2A corresponds to block 120 of the method of FIG. 1A. As shown in FIG. 2B, the structural information of the process (e.g., 240) may include a plurality of structural features (e.g., 241, 242, 243) and the structural information of the process model (e.g., 260) may include a plurality of structural features (e.g., 261, 262, 263). Thus, structural features of the process (240) may be compared with structural features of the process model (260). The comparison includes comparing a hash or fuzzy hash of each executable region of the process with a hashes or fuzzy hashes of executable regions included in the process model.

The comparison may result in finding an executable region in the process which has a hash or fuzzy hash which is inconsistent with the process model. This is known as a structural anomaly and may be caused by malware infecting the process. For instance malware may have created a new executable region in the process and/or altered the code of an existing executable region of the process, in order to carry out nefarious tasks, such as stealing passwords, keyboard logging or redirecting web requests etc.

At block 140A, in response to a determination that the process is infected with malware, the method generates a malware alert.

Block 110A is carried out on the computer system which is being examined to detect malware. Blocks 110B, 110C, 115, 130A and 140A may be carried out on either the computer system being examined, or on a remote computer system such as a server or a computer system of a security service provider.

Figure 3:
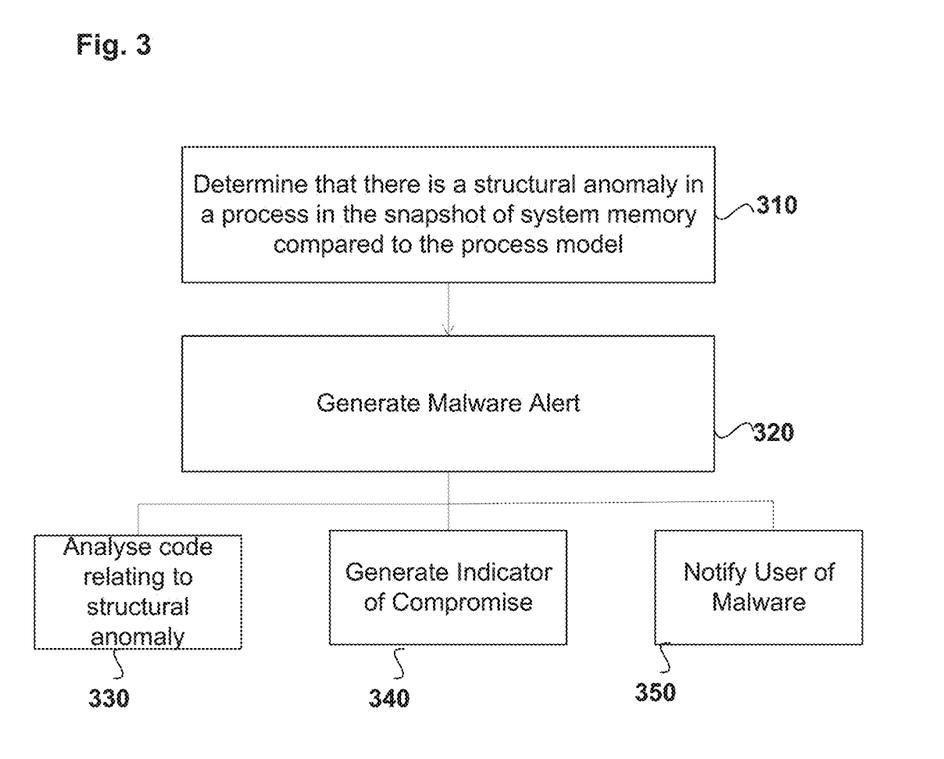
FIG. 3 shows an example method of generating a malware alert according to the present disclosure.

FIG. 3 shows examples of generating a malware alert in response to a determination that there is a structural anomaly in a process in the snapshot of system memory when compared to the process model.

At block 310 it is determined that there is a structural anomaly in the process.

At block 320 a malware alert is generated. The malware alert may trigger one of, or any combination of, the actions shown in blocks 330-350.

At block 330 the malware alert triggers a processor of the computing system to analyse code relating to the structural anomaly. For example, this may be a byte-wise analysis of the code. The analysis may determine whether the executable region which includes the structural anomaly is infected with malware. In this context, an executable region being infected with malware includes the whole executable region being malware, or a part of the executable region being malware.

For example, the executable region may have been newly created by malware in which case the whole executable region may constitute malware. In another example, the executable region may originally have corresponded to legitimate code, such as a shared library, but may have been modified by malware. In that case part of the executable region may contain malware, while the remainder of the executable region includes the original code. In some cases, the code of an executable region may have been modified to redirect to a malicious executable which is located elsewhere. This redirection of the executable to another executable is known as a hook. Analysis of the executable region may determine whether the code includes a hook to a malicious executable.

At block 340 the malware alert triggers a processor of the computing system to generate an indicator of compromise. In computer forensics, an indicator of compromise is an artifact observed in a system which to a high degree of confidence indicates the presence of malware. Indicators of compromise may be used by malware detection software as references against which a system under examination may be compared to detect if the system is infected with malware. In this case the indicator of compromise may include information relating to the detected structural anomaly. In this way, the malware is investigated and characterized to generate an indicator of compromise which may be used by other malware detection systems to detect the malware in the future.

At block 350 the malware alert triggers a processor of the computing system to notify a user of the presence of malware.

Figure 4A:
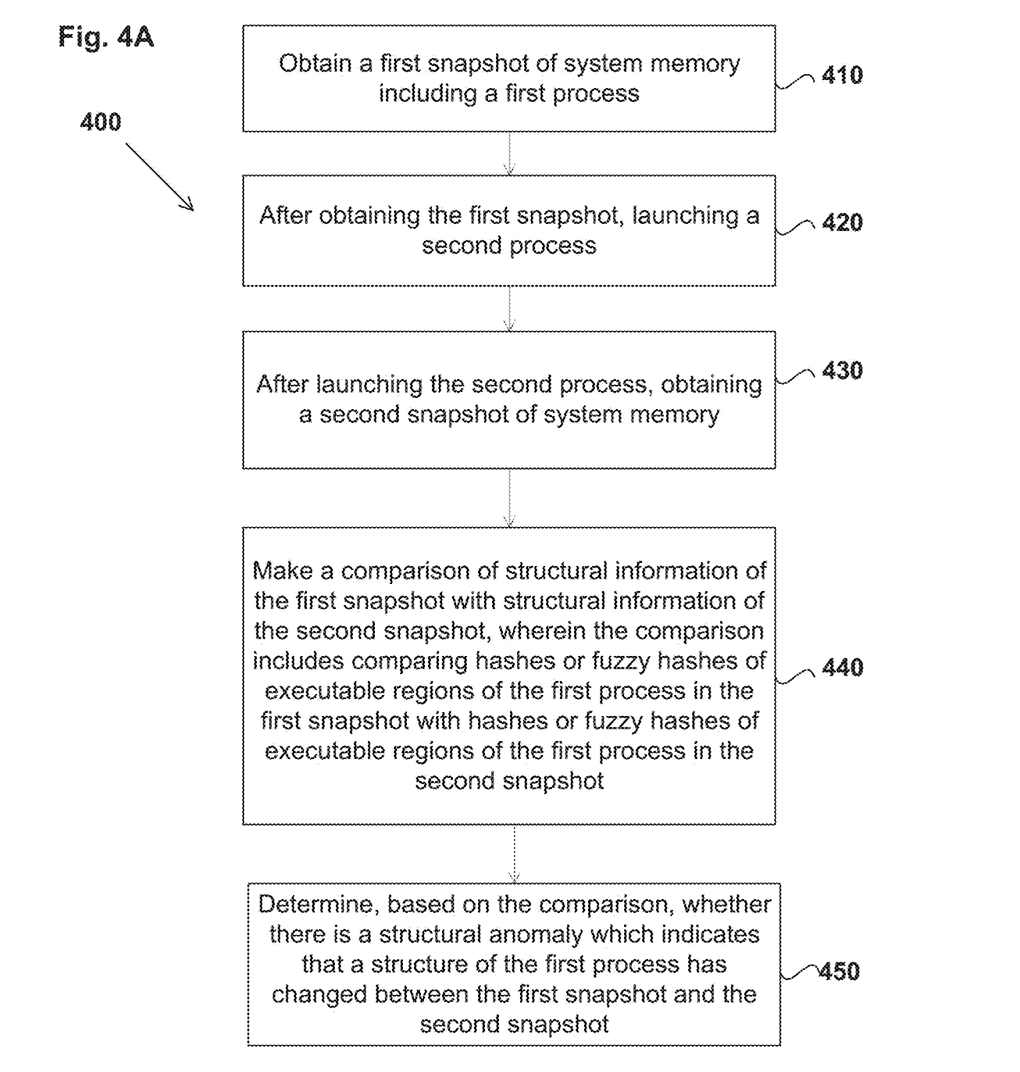
FIG. 4A shows an example method of comparing structural information of a first snapshot of system memory with structural information of a second snapshot of system memory according to the present disclosure.

FIG. 4A shows another example method 400 in which structural information of a process in a first snapshot of system memory is compared with structural information in second snapshot of system memory.

At block 410 a first snapshot of system memory, including a first process, is obtained.

At block 420, after obtaining the first snapshot, a second process is launched. The second process may for example be an executable which is suspected of being malware.

At block 430, after launching the second process, a second snapshot of system memory is obtained. This second snapshot may be obtained right after launching the second process, e.g. immediately afterwards or a few seconds afterward.

At block 440 structural information of the first snapshot is compared with structural information of the second snapshot. The comparison includes comparing hashes or fuzzy hashes of executable regions of the first process in the first snapshot with hashes or fuzzy hashes of executable regions of the first process in the second snapshot.

At block 450, a determination is made, based on the comparison, whether there is a structural anomaly which indicates that a structure of the first process has changed between the first snapshot and the second snapshot.

Usually one would not expect launching a second process to change the structure of a first process which is independent of the second process. Therefore, if the structure of the first process has changed, this structural anomaly may indicate that the second process is malware which has infected or manipulated the first process.

Figure 4B:
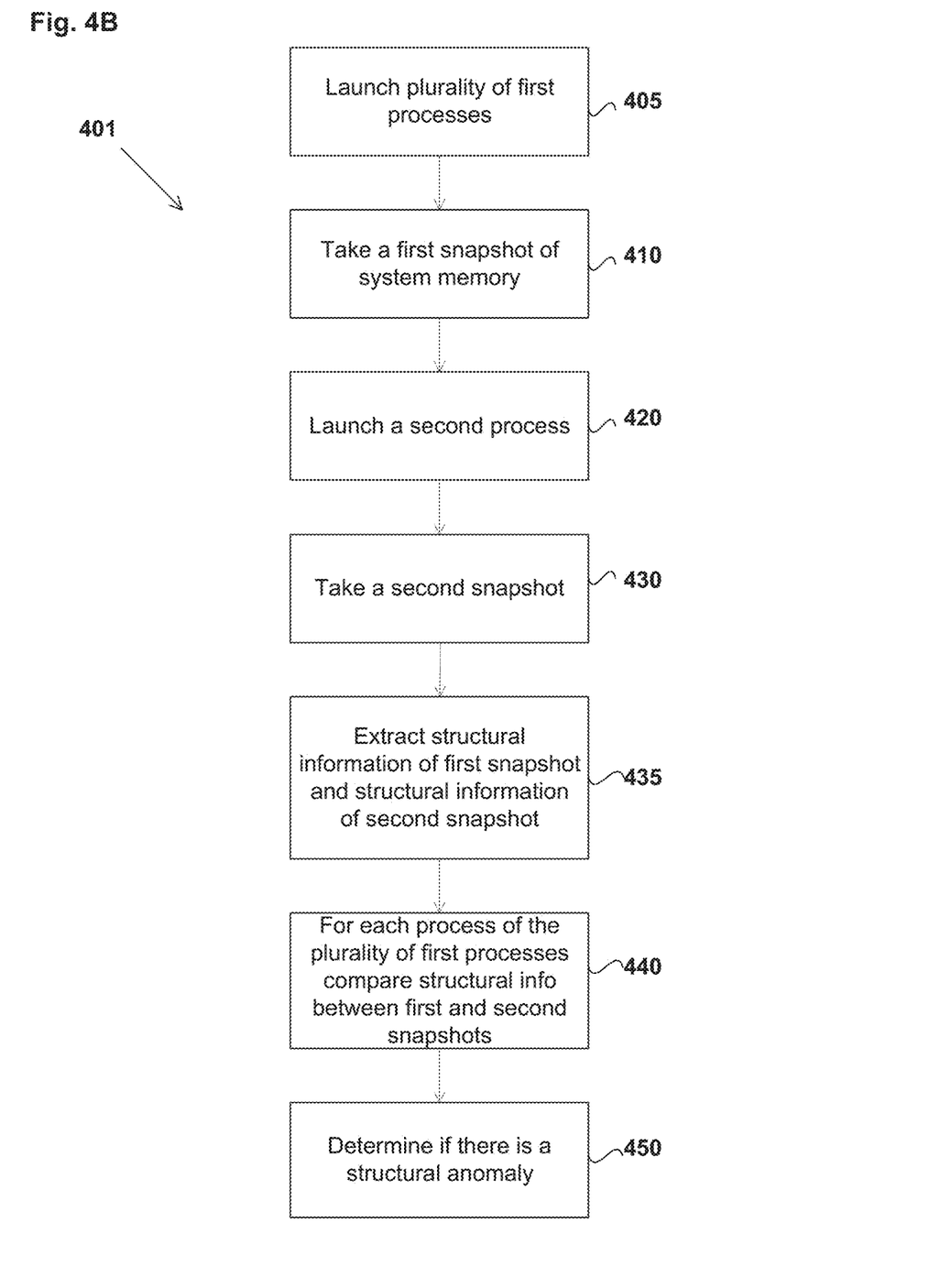
FIG. 4B shows an example method of comparing structural information of a first snapshot of system memory with structural information of a second snapshot of system memory according to the present disclosure.

FIG. 4B shows another example method 401, which may be similar to the method of FIG. 4A in some respects.

At block 405 a plurality of first processes are launched. For example, these may be programs which are launched when booting up a computer.

At block 410, a first snapshot of system memory is taken.

At block 420, a second process is launched, the same as in FIG. 4A.

At block 430, a second snapshot of system memory is taken.

At block 435, structural information of the first snapshot and structural information of the second snapshot are extracted. The structural information may include hashes or fuzzy hashes of executable regions for each of the plurality of first processes in the first snapshot and the second snapshot.

At block 440, for each process of the plurality of first processes, structural information of the process in the second snapshot is compared with structural information of the process in the first snapshot. This is the same as block 440 of FIG. 4A.

At block 450, based on the comparison in block 440, it is determined whether there is a structural anomaly in any of the first processes.

Thus, to sum up, structural information of each process of the first plurality of processes in a first snapshot may be compared with structural information of the same process in a second snapshot taken after a second process is launched. If the structure of the first process has changed, this may be indicative of malware. In response, a malware alert may be generated as described in any of the above examples, including FIG. 3.

The methods of FIGS. 1A, 2A and 2B may include detecting a structural anomaly between the structure of a process in a (second) snapshot of system memory and the structure of the corresponding process in an earlier (first) snapshot of system memory. In order to determine whether there is a structural anomaly in the process, a hash or fuzzy hash, of each executable region of the process in the second snapshot, may be compared with the hashes or fuzzy hashes of the executable regions of the corresponding process in the first snapshot.

Each process may include one or more executable regions. When an executable region has been loaded from an executable file on disk, the executable region may be identified by a name, such as an executable name or library name, which may be a name, pathname or partial pathname of the file etc. An executable region loaded from a file may be further identified by a hash. A hash is the result of a hash function which maps data of arbitrary size, in this case the contents of the process, or the contents of an executable region, to data of fixed size. The hash function may be any appropriate hash function, such as but not limited to SHA-1, SHA-2, SHA-3, SHA-256, BLAKE, BLAKE2, Whirlpool, Tiger or another hash function recommended by The National Institute of Standards and Technologies. In one example, the method of the present disclosure may determine a hash of an executable region by determining the pathname from which the executable region was loaded and applying a hash function to the file at the pathname. The file may be stored on a disk or other secondary storage medium. In other examples the hash of an executable region may be found in, or derived from, a digital signature or metadata of the file from which the executable region was loaded, or metadata of the memory snapshot.

A process in the second snapshot may be matched with a corresponding process in the first snapshot based on a main executable, e.g. a first executable region, of the process in the second snapshot, having the same name or hash as the main executable of a process in the first snapshot. Each executable region in the process in the second snapshot may then be compared, with the corresponding process in the second snapshot, to determine whether the corresponding process has an executable region with the same name and/or same hash. In this way it can be determined if the structure of the process has changed between the first and second snapshots.

Another way of comparing executable regions is by a fuzzy hash. A fuzzy hash is a hash produced by a fuzzy hash function. A fuzzy hash function is a hash function for which similar inputs produce the same or similar hashes. This is different to most hash functions, such as SHA-1, which may produce very different hashes for two inputs having minor differences. A comparison between the fuzzy hashes of two executable regions may produce a percentage similarity or other similar metric. Thus, an exact correspondence between two fuzzy hashes is not required for them to match, but rather a degree of similarity is calculated between the fuzzy hashes of the process and the process model, or between the fuzzy hashes of respective structural features, and they are deemed to match if the similarity is within a predetermined distance. Thus, a fuzzy has may act as a measure of content similarity In one example a rolling hash function is used to create the fuzzy hash. A rolling hash is a hash function whose input is generated from a window moving through the content of an executable region of the process. Some types of rolling hash may be calculated relatively rapidly thus facilitating comparison in a reasonable period of time. Such comparison, based on fuzzy hash, may be carried out much more quickly than byte to byte comparison and may detect a degree of similarity even if the exact order or sequence of bytes has some variance. Examples of fuzzy hash functions, include but are not limited to Ssdeep and the Nilsimsa Hash function.

Determining a fuzzy hash of an executable region may involve renormalizing the content of the executable region to compensate for address space layout randomization (ASLR). ASLR randomizes the location in address space of executables in a process, typically for reasons of security. ASLR may affect the fuzzy hash of executables in memory, but this may be compensated for by renormalizing the content of the executable regions before calculating the fuzzy hash. Renormalizing means reloading the executable into a predetermined address space, which may for example be near the middle of the available possible address spaces. In this way the fuzzy hashes calculated for the executable regions in a snapshot may approximate the average and form a good baseline with which to compare the fuzzy hashes of the executable regions in another (e.g. earlier) snapshot of system memory.

Using fuzzy hash matching makes it possible to identify and match not only executable regions corresponding to libraries and executables loaded from a file, but also executable regions corresponding to dynamically generated strings of executable code and other executables which have not been loaded from a file, or which are not in the module list of the process and which could not otherwise easily be matched. In particular, fuzzy hash matching makes it possible to compare anonymous unnamed executable regions which may form part of a process.

Furthermore, comparison by hash or fuzzy hash is especially helpful, as such comparison can detect anomalies which may be difficult or impossible to detect by comparing pathnames alone. For instance, if malware has hollowed out a process or changed the content of an executable, while leaving the name the same, then this may be detected by comparison of hashes or fuzzy hashes of the executable regions of the process in the first and second snapshots.

Table 1 below shows illustrative examples of some types of structural anomaly, which may be detected by the methods disclosed above, as well as some examples where there is no structural anomaly.

TABLE 1

| Example No. | Content of an executable region of a process in second snapshot | Content of matching executable region in the corresponding process in the first snapshot | Type of Structural Anomaly |
|---|---|---|---|
| 1 | Name: Word.exe<br>Hash: FD35 | Name: Word.exe<br>Hash: FD35 | Perfect Match: No structural anomaly |
| 2 | Name: Explorer.exe<br>Hash: 232F | Name: Explorer.exe<br>Hash: 232E | Executable region has same name, but different hash |
| 3 | Name: Explorer-helper.exe<br>Hash: 456A | | Executable region in second snapshot has no corresponding matching executable region in first snapshot |
| 4 | Name: none<br>Hash: none<br>Fuzzy hash: 100% match | Name: none<br>Hash: none<br>Fuzzy hash: 100% match | Perfect Match: No structural anomaly |
| 5 | Name: none<br>Hash: none<br>Fuzzy hash: 85% match | Name: none<br>Hash: none<br>Fuzzy hash: 85% match | Anonymous executable region has only 85% fuzzy hash match indicating differences in content and possible infection by malware. |
| 6 | HttpSendRequest.dll<br>Fuzzy hash: 85% match | HttpSendRequest.dll<br>Fuzzy hash: 85% match | Executable region has same name, but only 85% fuzzy hash match, indicating differences in content and possible infection by malware |

In example no. 1, an executable region of a first process in the second snapshot has the file name: word.exe and is signed with a hash FD35. The same process in the first snapshot also includes an executable region having the same file name and hash. This is a perfect match and accordingly there is no inconsistency. While example no. 1 just shows one executable region, a process may include a plurality of executable regions. If all the executable regions of the process match between the first and second snapshots then there is considered to be no structural anomaly.

In example no. 2, an executable region of a first process in the second snapshot has the file name: Explorer.exe and is signed with a hash 232F. The corresponding executable region in the first snapshot has the file name: Explorer.exe, but a different hash 232E. This inconsistency in the structural information between the two snapshots is considered to be a structural anomaly in the second snapshot. It may, for example, be due to malware having altered the code of Explorer.exe or due to malware having replaced the Explorer.exe file with a malware file having the same name.

In example no. 3, an executable region of a first process in the second snapshot has the file name: Explorer-helper.exe and has a hash 456A. There is no corresponding matching executable region in the first process in the first snapshot. Accordingly, this is a structural anomaly which may be indicative of malware, especially if the structural anomaly appeared in the first process immediately after the launching of an unrelated second process. For instance, the second process may be malware and Explorer-helper.exe may be malicious code with an innocent sounding name which was created by the second process and injected by the second process into the first process.

In example no. 4, an executable region has no name and is not associated with a file on disk. Accordingly, it has no hash. Such executable regions are called anonymous executable regions and may include dynamically created strings of code. Such anonymous executable regions may be legitimate and benign when they are created due to the normal functioning of the process, but may be malicious if they are created by malware. Anonymous executable regions can be compared between snapshots by use of fuzzy hashes. In this case, there is a 100% fuzzy hash match between an anonymous executable region in the first snapshot and an anonymous executable region in the second snapshots. This indicates that the content of the anonymous executable regions is the same. There is no structural anomaly.

In example no. 5, the closest match for an anonymous executable region in the second snapshot is an anonymous executable region in the first snapshot which has a fuzzy hash match of 85%. This is a structural anomaly, as a match of 85% indicates the content is not quite the same. This may be due to malware and thus may trigger further investigation of the content of the anonymous region in the second snapshot. In one example, if the best fuzzy hash match is 95% or above, this is considered to be good enough and not a structural anomaly, while matches below 95% are considered to be structural anomalies. However, 95% is given merely by way of example and the threshold above which a match is considered to be good enough and not a structural anomaly may be varied in accordance with the system in question and empirical experience.

In example no. 6, an executable region HttpSendRequest.dll of a process of the second snapshot has the same name, but only a 85% fuzzy hash match, with an executable region of the corresponding process in the first snapshot. This is a structural anomaly and indicates that the executable code of HttpSendRequest.dll has been modified. This may be due to malware and may trigger further investigation of the content of the executable region in the second snapshot.

Figure 5:
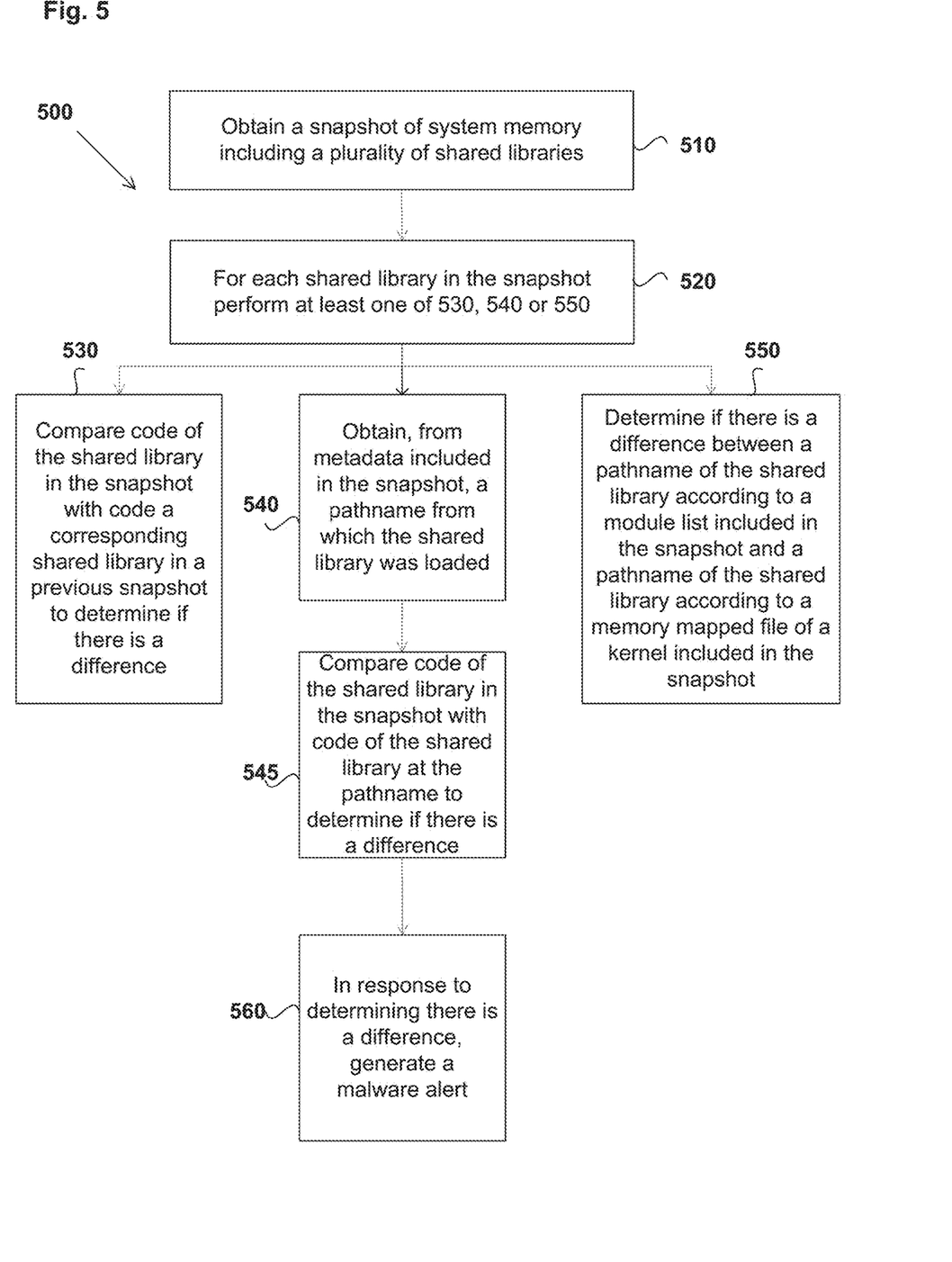
FIG. 5 shows an example of method of generating a malware alert based on analysis of shared libraries in a snapshot of system memory, according to an example of the present disclosure.

FIG. 5 shows another example method 500 of detecting malware which focuses on shared libraries. Shared libraries are used by application programs to carry out standard tasks, such as encryption, connecting to the internet, receiving keyboard input etc. Shared libraries are thus a common target of malware, as they may be modified to nullify encryption, redirect to malicious websites or log keystrokes and capture passwords etc. The method may be used to quickly scan the shared libraries in system memory to check for malware. As the scan may be limited to shared libraries, the scan may be fairly quick as other executable regions and data regions of the snapshot may be left out of the scan.

This method may be used to detect application program interface (API) hooking.

At block 510 a snapshot of system memory of a computer system is obtained. The snapshot includes a plurality of shared libraries.

At block 520, for each shared library, at least one of the detection methods in blocks 530, 540 or 550 is implemented.

At block 530, code of the shared library in the snapshot is compared with code of a corresponding shared library in a previous snapshot to determine if there is a difference.

The code may be compared by fuzzy hash as described in the methods above, or by byte-wise comparison of the code. In the case of byte-wise comparison, an initial portion of the shared library in the current snapshot may be compared with an initial portion of a shared library having the same pathname in the previous snapshot. As the comparison is with just a single shared library in a previous snapshot and may be limited to an initial portion without comparing the whole content of the library, the scan may be carried out quickly. In one example, a byte-wise comparison may be carried out to detect if the shared library includes a sequence of bytes which is indicative of a hook.

Initial portions of a shared library may be altered by malware to hook to a malicious executable. For instance a crypt.dll shared library may be altered by malware to insert a hook to a malicious executable which forwards an entered password to an owner of the malware, before returning to the main code of the crypt.dll to encrypt the password as normal. In this way a user may be unaware that the shared library has been compromised, as it appears to operate normally. By comparing the initial portion of the shared library with the initial portion of the shared library in a previous snapshot (which is presumed to be clean an uninfected), a hook to a malicious executable may be detected.

Not all hooks are malicious, as sometimes they are used for legitimate purposes. If a hook is detected, then the hook may be examined to determine whether it is to a signed executable. If the hook is to a signed executable, this may indicate that the hook is for legitimate purposes, especially if the signature corresponds to a hash of a known legitimate executable. However, if the hook is both not in the previous snapshot and to an unsigned executable, then it may be presumed to be malicious and a malware alert may be generated at block 560.

At block 540, a pathname from which the shared library was loaded is determined according to metadata in the snapshot. For example, a pathname of a memory mapped file relating to the extracted executable may be found in the kernel or in a module list of the process.

Following on from block 540, at block 545, code of the shared library at the snapshot is compared with code of the shared library at the pathname, to determine if there is a difference. For example, the shared library may be loaded into memory from the pathname and compared with the shared library which has been extracted from the snapshot to determine if there is a difference. The shared libraries may be normalized to compensate for ASLR before making the comparison.

If there is a difference between the code of the shared library from the snapshot and the shared library at the pathname, this may indicate that the shared library loaded into memory has been hijacked, or altered by malware, and is not the shared library which it claims to be. For example, the shared library in the snapshot of system memory may have been replaced by malware in whole, or may have been altered in part, for example by inserting a malicious hook, in order to conduct nefarious purposes such as hijacking a computer system or stealing passwords etc.

At least a portion of the extracted shared library may be compared with at least a corresponding portion of the loaded shared library. For instance, the initial portion of each function in the extracted shared library could be compared with the initial portion of each function in the loaded shared library. A function is a section of executable code which performs a specific task. Hooks to malware are usually found within the first few lines of a function. Therefore if the extracted shared library includes a hook in the initial portion of a function, while the shared library loaded directly from the pathname does not, then this may indicate the shared library in the snapshot was infected with malware which injected a malicious hook. It is also possible to check the whole content of the extracted shared library for hooks which do not exist in the loaded shared library, however checking the whole content is more time and processor intensive. Therefore, it may be more efficient just to compare initial portions of the shared libraries.

At block 560, a malware alert is generated in response to determining that a difference between the shared library at the pathname and the extracted shared library is indicative of a hook to malware.

For instance, it may first be determined if the difference is due to a hook and if a hook is found, the hook may be examined to determine whether it links to an executable which is known to be safe. In one example, if the hook is to an executable which is named and signed then it is considered to be safe, but otherwise it is considered to be indicative of a hook to malware. Signed means that the executable is signed by a secure key, to identify the executable as originating from a trusted source.

At block 550, it is determined whether there is a difference between the pathname of the shared library according to a module list included in the snapshot of system memory and a pathname of the shared library according to a memory mapped file of a kernel included in the snapshot. These two pathnames should be consistent. If there is a difference, this may indicate that the shared library has been hijacked by malware and a malware alert may be generated at block 560.

Any of the methods described herein may be stored as a set of machine readable instructions on a non-transitory storage medium and executed by a processor.

Figure 6:
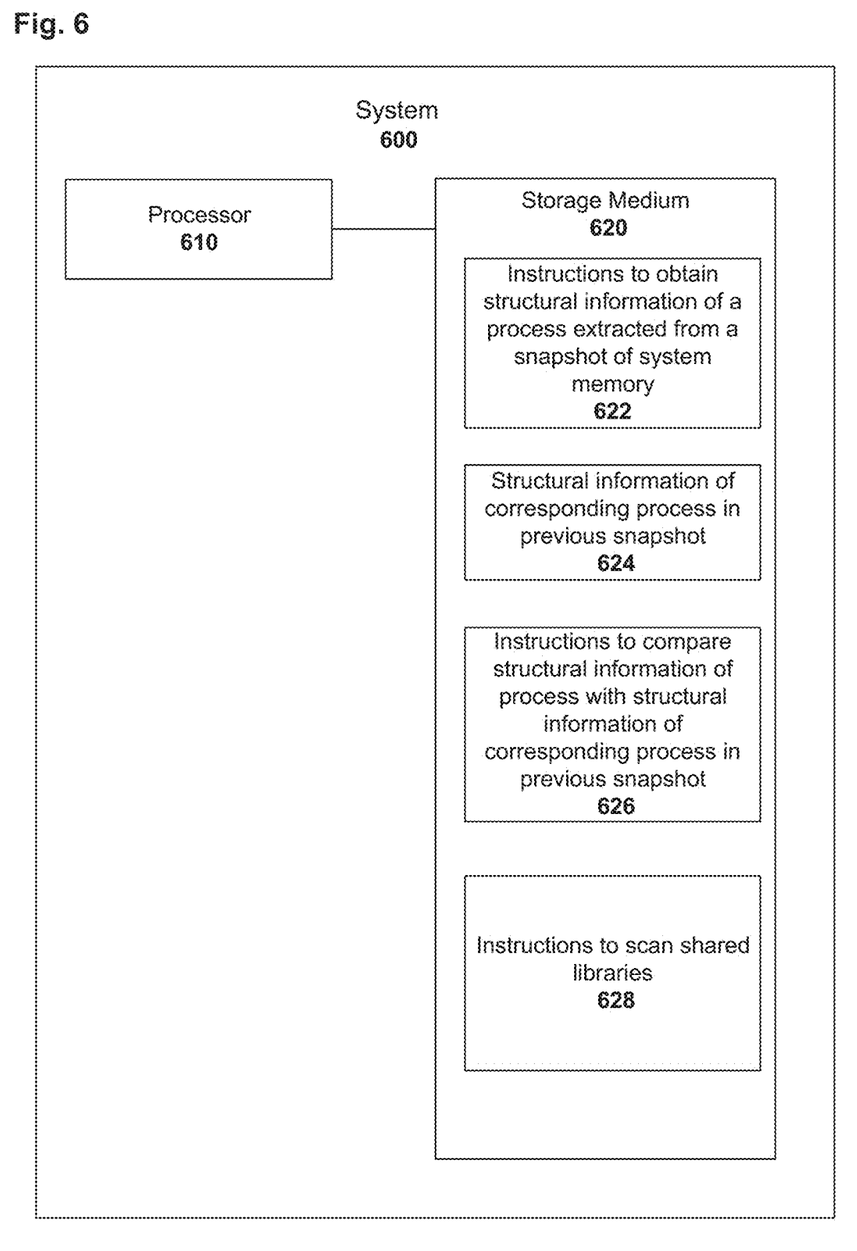
FIG. 6 shows an example system according to the present disclosure.

FIG. 6 is a system diagram showing an example of a computer systems for implementing the methods described herein.

FIG. 6 shows a computer system 600 which comprises a processor 610 and a non-transitory computer readable storage medium 620. The processor may for example be a central processing unit (CPU), microprocessor or other electronic processing device. The storage medium may for example be a hard disk, flash drive or memory etc of a computer system.

The storage medium 620 stores machine readable instructions which may be read and executed by the processor. The instructions may include instructions to perform any of the methods, or any part of the methods disclosed herein. For example, the instructions include a set of instructions 622 to obtain structural information of a process extracted from a snapshot of system memory. When executed by the processor these instructions cause the process to obtain the structural information, for example by performing the method of block 110 of FIG. 1A. The instructions further include a set of instructions 626 to compare structural information of the process with structural information 624 of a corresponding process in a previous snapshot of system memory, for example by performing the method of any of FIG. 1A, 2A, 2B, 3, 4A or 4B. The instruction may further include instructions 628 to scan shared libraries in the snapshot to determine whether they are infected with malware, for instance according to the method shown in FIG. 5.

All of the features disclosed in this specification (including any accompanying claims, abstract and drawings), and/or all of the blocks of any method so disclosed, may be combined in any combination, except combinations where at least some of such features and/or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A non-transitory computer readable storage medium storing instructions executable by a processor to:
    extract a process list from a kernel portion of a snapshot of a system memory, wherein the kernel portion comprises a portion of the snapshot corresponding to an operating system kernel;
    obtain structural information of a process of the process list, wherein the process has associated executable, regions associated with a plurality of executables, the plurality of executables being loaded into the system memory from corresponding files, and the structural information includes a hash or fuzzy hash of each executable region of the executable regions of the process;
    compare the structural information of the process with a process model which includes hashes or fuzzy hashes of executable regions of the same process in a previous snapshot of the system memory;
    determine there is a structural anomaly in response to a determination that the structural information includes a hash or fuzzy hash which is inconsistent with the process model; and
    in response to determining that there is a structural anomaly, generate a malware alert.

2. The medium of claim 1 wherein the malware alert triggers instructions to analyse at least a portion of the code of an executable region that includes the structural anomaly to determine whether the executable region is infected with malware.

3. The medium of claim 1 wherein the instructions include instructions to match the process in the snapshot of system memory with one process model of a plurality of process models, in response to an identifier of the process matching an identifier of said one of the plurality of process models.

4. The medium of claim 1 wherein the structural information of the process includes a fuzzy hash of at least one executable region of the executable regions of the process and the instructions include instructions to determine that said fuzzy hash is inconsistent with the process model in response to determining that the process model does not include a matching fuzzy hash.

5. The medium of claim 1 wherein the instructions include instructions to determine that a hash or fuzzy hash of an executable region of the executable regions of the process is inconsistent with the process model in response to determining that the process includes an executable region which has the same name, but a different hash or fuzzy hash, compared to the executable region in the process model.

6. The medium of claim 1 wherein the plurality of executables comprises a main executable to control a flow of the process and a library executable.

7. A method comprising:
    obtaining a first snapshot of a system memory including a kernel portion, a process list in the kernel portion and a first process in the process list, wherein the first process is associated with a plurality of executable regions associated with a plurality of executables, the plurality of executables being loaded into the system memory from corresponding files, and the kernel portion comprises a portion of the first snapshot corresponding to an operating system kernel;
    after obtaining the first snapshot, launching a second process;
    after launching the second process obtaining a second snapshot of the system memory;
    making a comparison of structural information of the first snapshot with structural information of the second snapshot; and
    determining, based on the comparison, whether there is a structural anomaly which indicates that a structure of the first process has changed between the first snapshot and the second snapshot;
    wherein making a comparison of the structural information of the first snapshot with the structural information of the second snapshot includes comparing hashes or fuzzy hashes of the executable regions of the first process in the first snapshot with hashes or fuzzy hashes of executable regions of the first process in the second snapshot.

8. The method of claim 7 comprising determining that there is a structural anomaly, in response to determining that a hash or fuzzy hash of the first process exists in the second snapshot and does not exist in the first snapshot.

9. The method of claim 7 comprising determining that there is a structural anomaly, in response to determining that an executable region of the executable regions of the first process has a different hash or different fuzzy hash in the second snapshot compared to the first snapshot.

10. The method of claim 7 comprising determining that there is a structural anomaly, in response to determining, based on a fuzzy hash, that an anonymous executable region of the first process exists in the second snapshot and that there is no corresponding anonymous executable region in the first snapshot.

11. The method of claim 7 further comprising, in response to determining that there is a structural anomaly, analysing code of an executable region which corresponds to the structural anomaly.

12. The method of claim 7 further comprising, in response to determining that there is a structural anomaly, generating a malware alert.

13. The method of claim 6 further comprising, in response to determining that there is a structural anomaly, generating an indicator of compromise for use in a malware detection system, said indicator of compromise including information relating to the structural anomaly.

14. The method of claim 7 comprising launching a plurality of first processes before obtaining the first snapshot of system memory and comparing structural information of each of said first processes in the first snapshot with structural information of a corresponding process in the second snapshot.

15. The method of claim 7, comprising obtaining structural information of the first process in the first snapshot and the second snapshot by identifying structural features of the first process in each of the first snapshot and the second snapshot and determining a name, hash or fuzzy hash for each identified structural feature.

16. A non-transitory machine readable medium storing instructions which are executable by a processor to:
  obtain a snapshot of a system memory of a computer system, the snapshot including a kernel portion corresponding to an operating system kernel and the snapshot being associated with a plurality of shared libraries;
  for each shared library of the plurality of shared libraries, determining a corresponding pathname for the shared library from a process list included in the kernel portion or from the kernel portion relating a memory mapped file to the shared library;
  for each shared library of the plurality of shared libraries, make a comparison of code of the shared library with code of a corresponding shared library associated with a previous snapshot of the system memory to determine whether there is a difference; and
  generate a malware alert, in response to a determination that there is a difference.

17. The medium of claim 16 wherein the instructions to make a comparison include instructions to compare an initial portion of the shared library in the snapshot with an initial portion of the corresponding shared library from the previous snapshot, or with an initial portion of the shared library at a pathname from which the shared library was loaded, without comparing the whole content of the shared library.

18. The medium of claim 16 wherein the instructions include instructions to, in response to a determination that there is a difference, conduct a byte-wise analysis to determine whether the shared library in the snapshot includes a sequence of bytes which is indicative of a hook to an executable.

19. The medium of claim 17 wherein the instructions include instructions to generate the malware alert in response to determining that the shared library in the snapshot includes a hook to an unsigned executable.

20. The medium of claim 16 wherein the instructions comprise instructions executable by the processor to:
  determine whether there is a difference between a pathname of the shared library according to a module list included in the snapshot and a pathname of the shared library according to a memory mapped file of a kernel included in the snapshot; and
  generate the malware alert, in response to a determination that there is a difference between the pathname of the shared library according to the module list included in the snapshot and the pathname of the shared library according to the memory mapped file.

* * * * *